United States Patent Office 3,298,498
Patented Jan. 17, 1967

3,298,498
WORK PIECE INVERTER CONVEYOR
Robert E. Smith, Chicago, Robert L. Kosrow, Elk Grove Village, and John G. Attwood, Oak Park, Ill., assignors to Union Special Machine Company, Chicago, Ill., a corporation of Illinois
Filed June 4, 1965, Ser. No. 461,240
10 Claims. (Cl. 198—33)

This invention relates to new and improved apparatus for automatic manipulation of selected flat flexible material work pieces. In particular it relates to apparatus for automatically inverting such work pieces into an upside down position with respect to the position in which they are delivered to the apparatus.

The invention is particularly useful in the garment industry where stitched articles, such as garments, are made from fabric sections, but it can also be used in other industries which have similar work pieces and similar requirements for inverting selected work pieces.

The manufacture of garments and other stitched articles generally begins at the cutting table. Here the fabric is laid out in a fairly thick multi-layer stack by pulling it from a roll and laying it back and forth over the table in many successive layers. The laid out material is then marked, and garment sections of a desired size and shape are cut simultaneously from the entire stack.

In the back and forth laying up process, an outside surface of the material will be folded upon another outside surface followed by an inside surface on an inside surface, and so forth. As a result, adjacent layers in a cut stack of garment sections will face in different directions. One will face up and the sections adjacent to it will face down.

After being cut, the work pieces are taken off the stack one by one as needed for further processing. Such processing often requires that all the workpieces face uniformly up or uniformly down, so it is necessary to select and invert the ones which are improperly oriented. Heretofore this has been done by hand. Sometimes it has been done by an extra operator and sometimes by adding to the workload of the sewing machine operator. Inverting these work pieces by hand, however, requires a certain number of motions on the part of the operator. Some of these motions are unavoidably wasted, and since labor is an expensive commodity waste motions, particularly in large scale productions, increase the cost of goods sold significantly and reduce the efficiency of the operation.

It is one object of this invention to provide apparatus for automatically selecting certain being conveyed flexible flat material work pieces and for inverting such selected work pieces.

It is a further object of this invention to provide an apparatus having the above characteristics which is capable of selecting and inverting work pieces of different lengths and shapes.

It is another object of this invention to provide an apparatus having the foregoing characteristics which will automatically invert every other work piece.

Still another object of the invention is to provide apparatus having the foregoing characteristics which will automatically repeat a portion of its operational cycle whenever two superimposed work pieces pass into the apparatus.

Another object of this invention is to provide apparatus having the foregoing characteristics which is combinable with other work handling apparatus and which can be controlled with such other apparatus by a master control.

Various other objects and advantages will appear from the description of the invention hereinafter, one embodiment of which, including its novel features, will be particularly pointed out in connection with the accompanying drawings and by the appended claims.

This invention is designed to invert selected work pieces automatically and to do away with the need for an operator to oversee its functioning. The apparatus is built so that it will automatically select every other work piece for inverting. Automatic selection of alternate work pieces means that the machine operates in two phases, namely a non-inverting phase and an inverting phase. One phase follows the other so that when a work piece passes through the machine without being inverted the next one will automatically be inverted.

During the non-inverting phase nothing happens to the work piece except that it is conveyed from the input end of the apparatus to the delivery end. No operation is performed on it at all. During the inverting phase the work piece is also conveyed from the input to the delivery end of the apparatus, but in between these two points it is inverted. This is accomplished by lifting the leading edge of the work piece and holding it tightly while an inverter rod mechanism contacts the upper surface of the work piece between its raised front edge and the conveyor, and moves forward, pushing the main portion of the work piece underneath and ahead of the point at which it is held so as to flip it over on its back. In this process, of course, the original leading edge becomes the trailing edge of the work piece.

Work pieces are normally fed to the apparatus in single layers, but on occasion due to an error in picking them off the stack two thicknesses will be fed at a time. When this happens the normal phase sequence of the apparatus must be temporarily altered. If this were not done, after a double thickness has appeared at the input end, the apparatus would begin to invert the wrong work pieces, and leave uninverted those that should be inverted. Means are therefore provided for automatically temporarily changing the sequence of the inverting and non-inverting phases of the operational cycle of the machine when a double thickness of layers appears. In case manual rather than automatic control is desired, a hand operated switch for manually changing the sequence of these phases is also provided. In addition, a phase sequence light is provided to indicate whether the next phase of apparatus operation will be a non-inverting phase or an inverting phase. If the light is on it indicates that the next phase will be an inverting phase.

The apparatus is a self contained unit capable of operating by itself without being coupled to any other device, but the best use of it can be made when it is placed ahead of or after another work handling device on which a work piece will undergo some operation. In fact it may desirably be positioned between two other work handling devices. When operating with one or more other work handling devices the apparatus of this invention can be powered from a master control unit designed to coordinate the operations of the units cooperating with each other.

For a more complete understanding of the invention, reference is made to the detailed description which follows hereafter, and to the drawings in which:

FIG. 5 is a rear elevational view of the apparatus of

FIG. 1, with a portion of the belt support platform removed and other portions shown in section;

FIG. 6 is a perspective fragmentary detailed view of the friction wheel and clamp rod driving arrangement;

FIG. 7 is a fragmentary detailed view in section showing a way of mounting the drive rollers for the conveyor belts;

Referring now to the drawings, the apparatus comprises a sub-structure, a conveyor mechanism and an inverter mechanism. Referring more particularly to FIGURES 1–4 the sub-structure is shown as comprising a supporting table including a bottom plate 13, to which are connected at its four corners, vertical members 14 which support a mounting plate 15 at their upper ends. Preferably mounting plate 15 lies parallel to bottom plate 13, and serves as a support for the conveyor mechanism and inverter mechanism which are mounted on top of it. Vertical support members 14 may be bolted or otherwise secured to bottom plate 13 and mounting plate 15 to give rigidity to the table.

Bolted on top of mounting plate 15 is a conveyor/inverter support assembly 16 (see FIGS. 1 and 2) comprising a front wall 18, and a rear wall 19 supported by adjustable mounting brackets 20. Brackets 20 are bolted to a base plate 17 which is fixed on top of mounting plate 15. The front and rear walls are vertically adjustable in mounting brackets 20 as most clearly seen in FIG. 2. Mounted above base plate 17 is a conveyor belt support platform 21 which is held above the base plate by platform legs 22.

Figure 1:
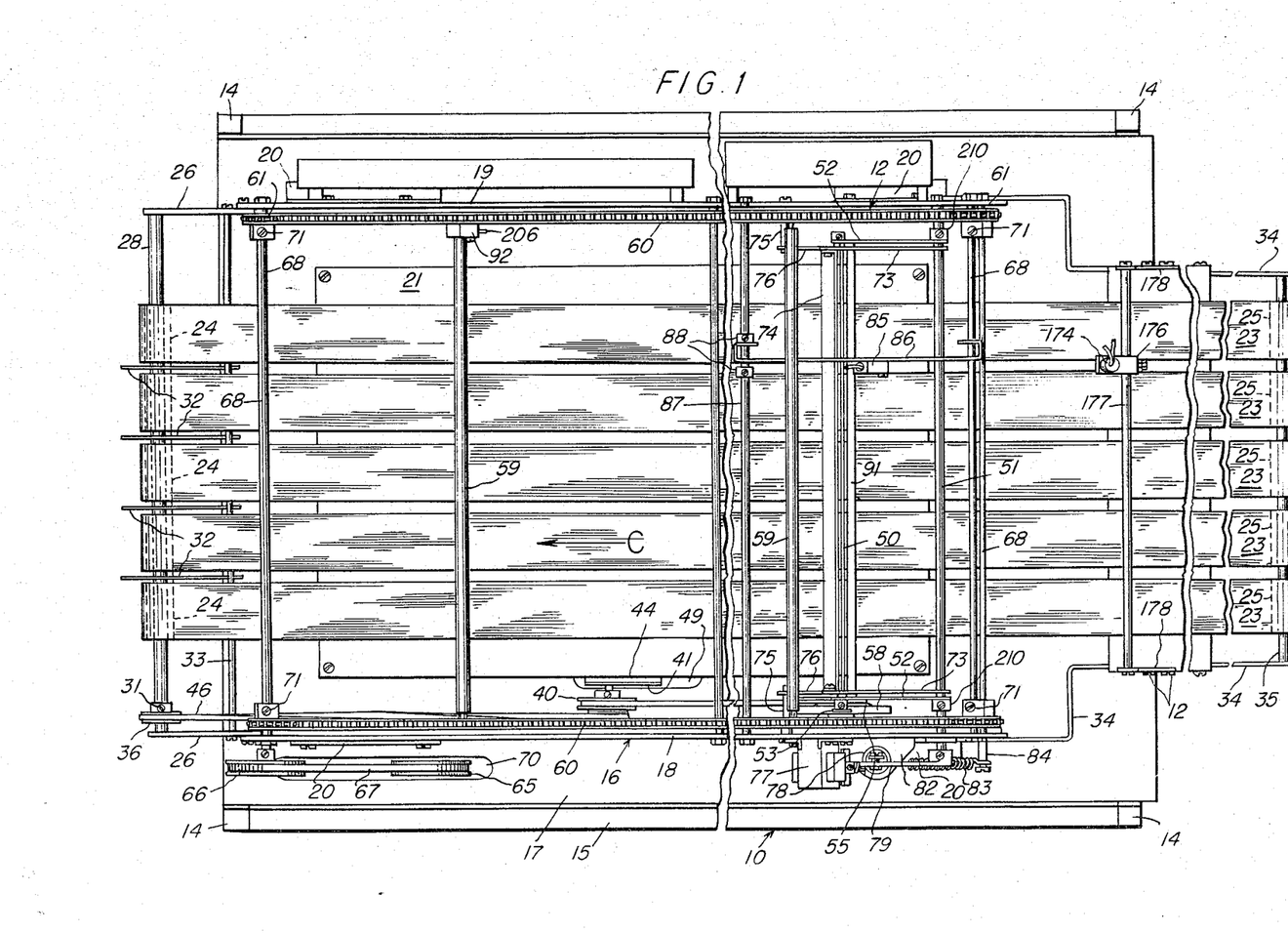
FIG. 1 is a top plan view of a machine illustrating the preferred embodiment of the invention.
Figures 5, 6, 7:
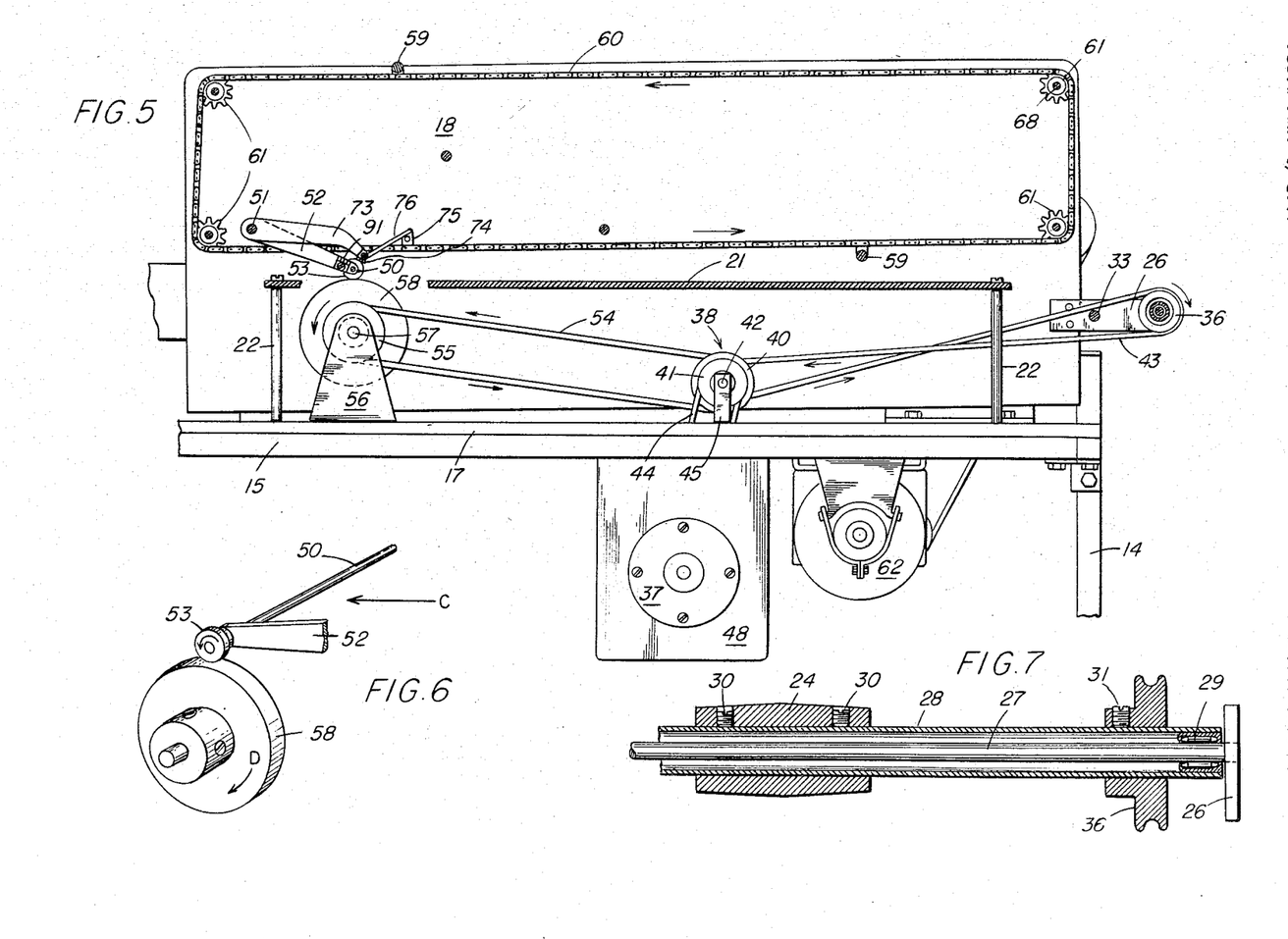

Referring to FIGS. 1 and 7, the conveyor mechanism which carries the work pieces from the input to the delivery end of the apparatus includes a plurality of endless conveyor belts 23 trained around driving rollers 24 at the delivery or output end and around idle rollers 25 at the input end. Both driving rollers 24 and idle rollers 25 are double cone-shaped as shown in FIG. 7. This serves to retain the belts in proper alinement. Driving rollers 24 are mounted on a sleeve or hollow shaft 28 which surrounds, but is separated from a stationary supporting rod or shaft 27 by needle bearings 29 so that the sleeve is freely rotatable around the supporting rod or shaft. Supporting shaft 27 is fixedly retained between front and rear walls 18, 19 by support brackets 26 which are rigidly mounted on these walls. Rollers 24 are separated a slight distance from each other on sleeve 28 and are fixedly attached thereto by screws 30. A number of horizontally disposed and downwardly curved stripper wires 32 protrude outwardly between driving rollers 24. They extend from a mounting bar 33 which is fixedly secured at its opposite ends to roller shaft support brackets 26. Mounting bar 33 has a number of holes (not shown) in it for holding stripper wires 32. The latter prevent carrying of the work pieces downwardly around rollers 24 at the output end of the conveyor belts.

Idle rollers 25 are mounted in a manner similar to drive rollers 24. They are secured to an idle roller carrying sleeve 35, having needle bearings (not shown) between it and a fixed rod or shaft (not shown) which is secured to two idle roller shaft support brackets 34. Idle roller support brackets 34 are affixed to front and rear walls 18, 19 but they differ from roller shaft support brackets 26 in that their position is longitudinally adjustable by means of set-screws 12 cooperating with elongated openings in brackets 34 to maintain proper tension in belts 23 by thereby adjusting the distance between rollers 24 and 25. On top of brackets 34 is a plate 209 which serves as an extension of conveyor belt support platform 21. Drive roller sleeve 28 has a pulley 36 rigidly mounted by a set-screw 31 on the front end of the sleeve. It is adapted to rotate sleeve 28 from a motor 37 (FIGS. 3 and 5) via a belt assembly 38 (FIGS. 4 and 5) which is mounted on base plate 17 by brackets 45. Assembly 38 comprises pulleys 39, 40 and 41 rigidly mounted on a shaft 42 which is rotatably journaled at its ends in brackets 45. Assembly 38 is connected to pulley 36 by a drive belt 43 which is trained around both pulley 36 and pulley 39. It is connected to motor 37 by a belt 44 trained around pulley 41 and a motor pulley 46 which is mounted on motor shaft 47. Motor 37 is mounted under the table on a support plate 48 suspended from mounting plate 15. Motor belt 44 passes up through an opening 49 (see FIG. 1) in base plate 17 and mounting plate 15 to belt assembly 38.

Included as part of the conveyor mechanism is a clamp rod 50 which at times lies on conveyor belts 23 between the input and output ends of the apparatus. Clamp rod 50 is also part of the inverter mechanism as will be explained hereinafter in connection with a description of that portion of the apparatus. Clamp rod 50 is mounted between front and rear walls 18, 19 via a rock shaft 51 and rock arms 52. Rock shaft 51 is rotatably journaled in front and rear walls 18, 19 and one end of each rock arm 52 is secured to the rock shaft 51 via an adjustable collar 210. The free ends of rock arms 52 extend toward the delivery end of the apparatus. Clamp rod 50 is rotatably journaled into these free ends, and is rotated by a driving disc 53 mounted on one end of the clamp rod adjacent front wall 18 (FIG. 5). Power is supplied to driving disc 53 from belt assembly 38 via pulley 40, a pulley 55 which is rigidly mounted on a pulley shaft 57 and a belt 54 trained around pulleys 40 and 55. Shaft 57 is rotatably journaled above base plate 17 in suitable support brackets 56 which are mounted on the plate. Also fixed on shaft 57 is a friction wheel 58 with which driving disc 53 is frictionally engaged when clamp rod 50 contacts conveyor belts 23.

Figure 4:
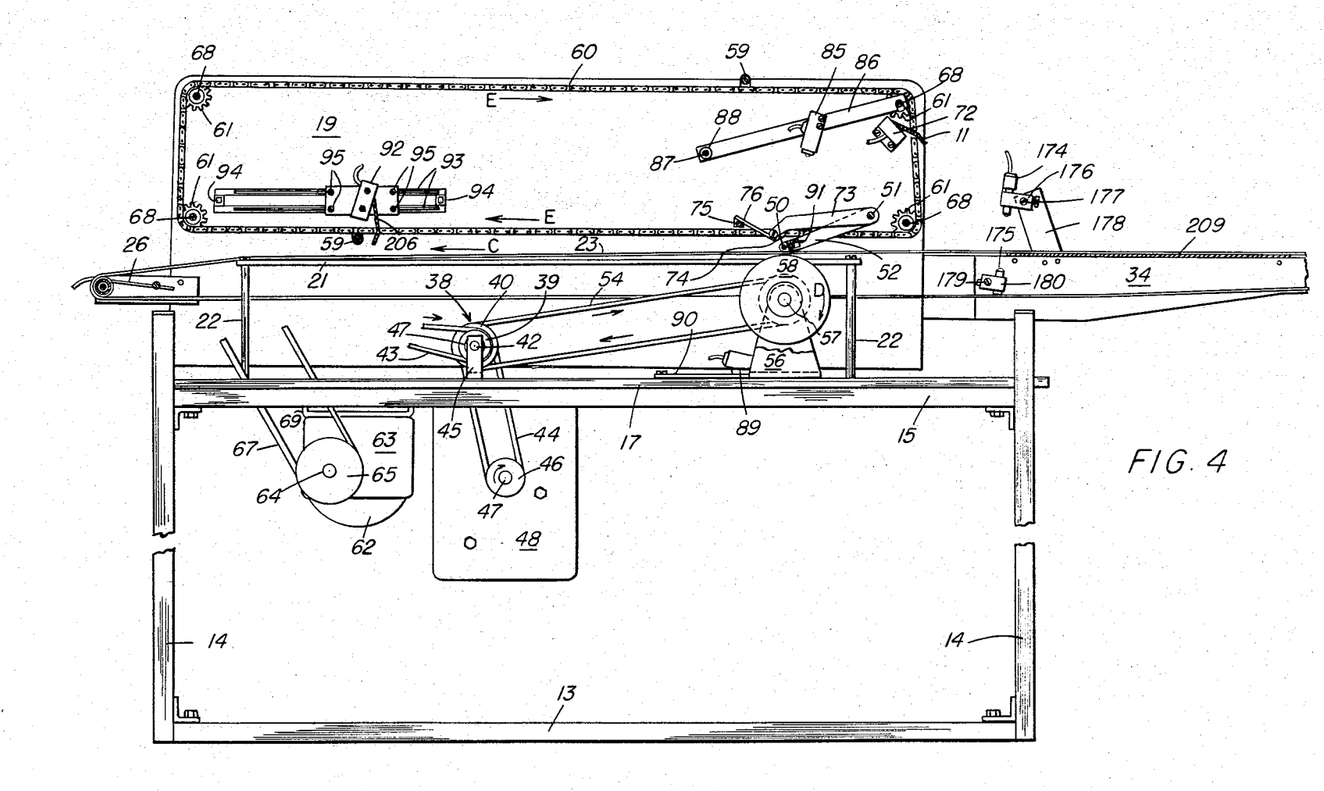
FIG. 4 is a front elevational view of the preferred embodiment of the invention with the front wall removed and a portion of the extended belt support platform shown in section.

Thus, rotation of motor 37 causes rotation of clamp rod 50 via friction wheel 58 and its frictional engagement with driving disc 53. Due to a twist in drive belt 43 (see FIG. 3, or FIG. 5) clockwise rotation of motor 37 as shown in FIG. 4, will move the upper run of conveyor belts 23 to the left as indicated by arrow C. It will also result in clockwise rotation of friction wheel 58, as shown by arrow D, in FIGS. 4 and 6 and in counterclockwise rotation of clamp rod 50. The bottom half of clamp rod 50 will therefore rotate against the direction C of conveyor belt motion beneath it.

The inverter mechanism includes two inverter rods 59 mounted between front and rear walls 18, 19 on two endless chains 60. Each chain 60 is trained around four sprocket wheels 61 disposed in a rectangular pattern adjacent the inner faces of the front and rear walls 18, 19. Sprocket wheels 61 are rigidly mounted by screws 71 (FIG. 1) on four shafts 68 extending between and journaled in suitable bearings (not shown) in these walls. The inverter rods 59 are each connected at their ends to diametrically opposite points on both chains 60 so that each always moves in a direction which is opposite that of the other. For example, as seen in FIG. 4, when one travels to the right the other moves to the left, and when one travels up at the left the other moves down at the right.

Figure 2:
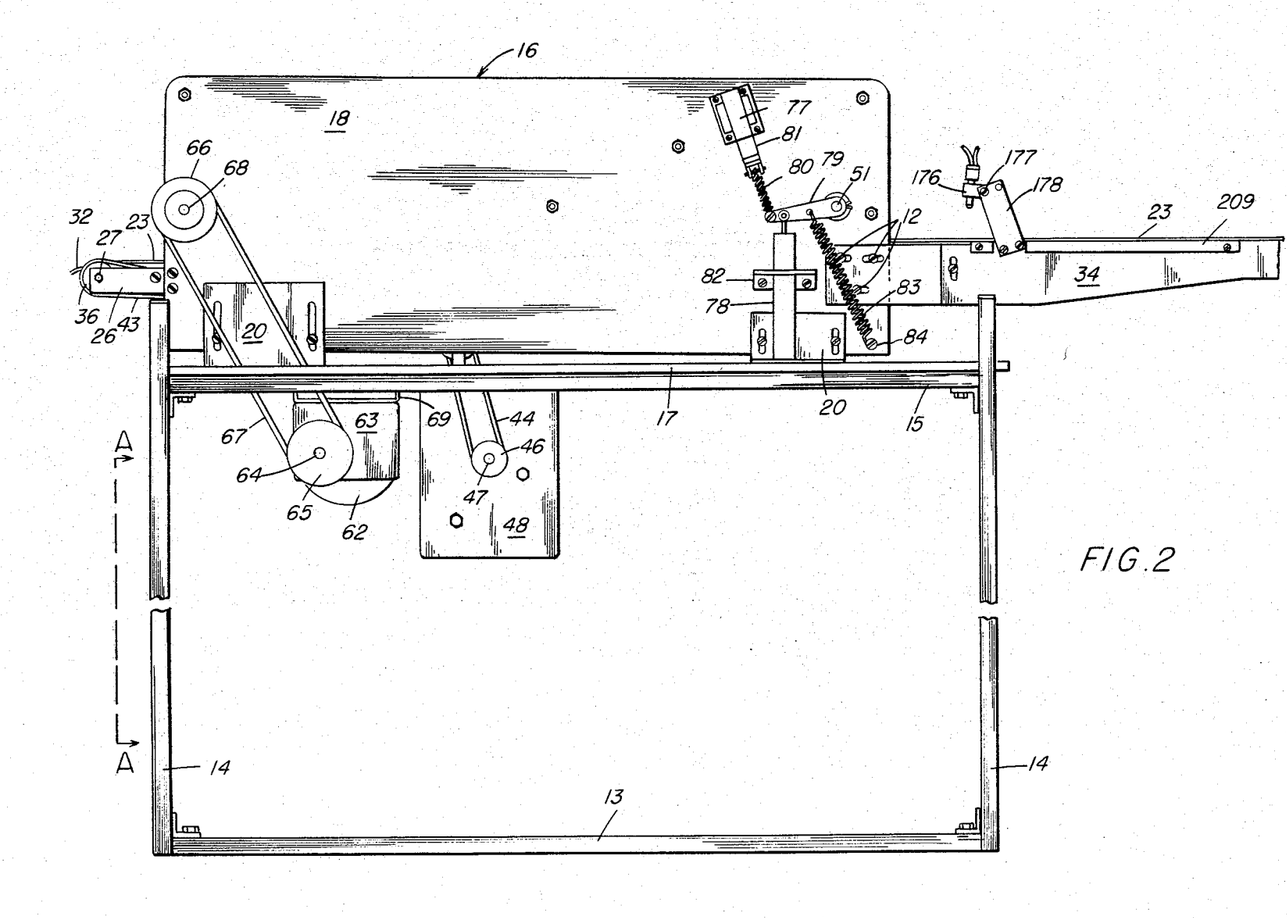
FIG. 2 is a front elevational view of the apparatus of FIG. 1.
Figure 3:
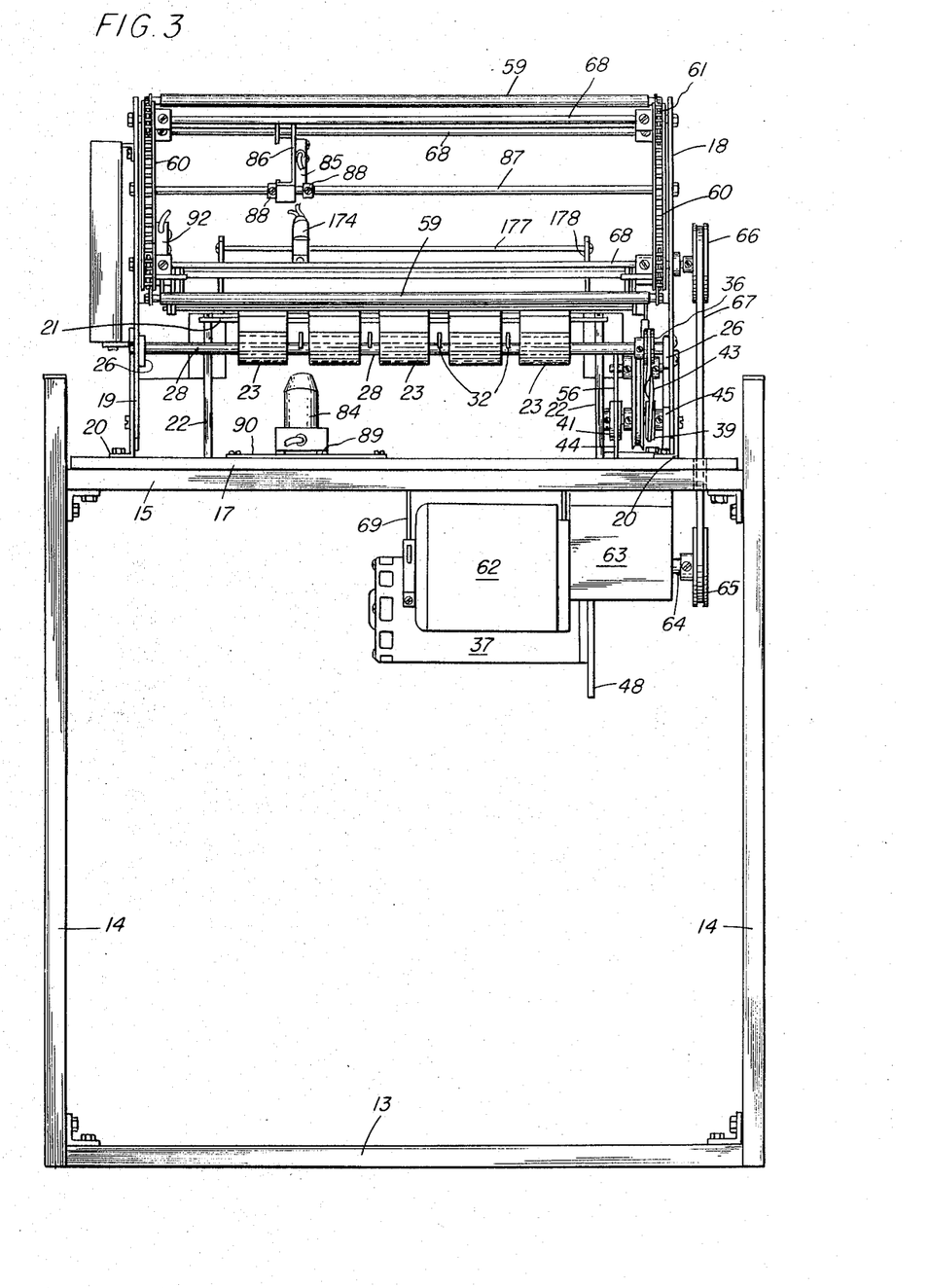
FIG. 3 is a side elevational view of the apparatus of FIG. 1 taken in the direction shown by the arrow AA in FIG. 2.

Power for driving chains 60 and moving rods 59 comes from an inverter rod motor 62 via gear reduction box 63 having a drive shaft 64 and a pulley 65 mounted on the drive shaft. Pulley 65 is connected to a pulley 66 by a drive belt 67. Pulley 66 is mounted on the end of the lower left hand sprocket wheel shaft 68 as seen in FIG. 2 which protrudes through front wall 18. Motor 62 and gear box 63 are suspended from mounting plate 15 on a bracket 69 similarly to motor 37, and drive belt 67 passes through an opening 70 (see FIG. 1) in both the mounting plate 15 and base plate 17 to reach pulley 66.

Clockwise rotation of pulley 65 as seen in FIG. 4 causes sprocket wheels 61 to rotate in the same direction so that both upper runs of chains 60 move to the right while the lower runs move to the left as shown by the arrow E. A normally closed micro switch 72 is mounted adjacent the upper right sprocket wheel 61 on rear wall 19 as seen in FIG. 4. Micro switch 72 has an arm 11 which opens the switch thereby shutting off inverter rod motor 62 when engaged by an inverter rod 59. Micro switch 72 closes again by itself as soon as inverter rod 59 has passed arm 11.

Also, the inverter mechanism includes a pair of swing arms 73 supported at one end by rock shaft 51 but freely rotatable about the rock shaft at points adjacent, but inwardly of rock arms 52. Fixed between the other ends of swing arms 73 is a clamp plate 74 which is parallel to but held above conveyor belts 23 by rest pins 75 that are engaged by swing arm extensions 76 which are connected to swing arms 73. Rest pins 75 are mounted on front and rear walls 18, 19 and extend inwardly therefrom to support swing arm extensions 76.

Rock shaft 51 extends through front wall 18 (see FIG. 2) and is rotatable through a fixed angle by a solenoid 77 under the control of a dashpot 78. Solenoid 77 is mounted on the front face of front wall 18 and has its armature 81 connected to rock shaft 51 through a tension spring 80 and a crank arm 79. One end of the crank arm is rigidly connected to the rock shaft 51. Tension spring 80 is connected between armature 81 and the outer end of crank arm 79. Dashpot 78 is mounted on the front of front wall 18 by means of a bracket 82, and is pivotably connected to crank arm 79 at a point intermediate its two ends, but near tension spring 80. One end of a second tension spring 83 is pivotably connected to crank arm 79 between rock shaft 51 and the point of connection of dashpot 78 to said arm. The other end of spring 83 is fixedly attached to front wall 18 by a pin 84. The function of tension springs 80, 83 and dashpot 78 is to prevent too abrupt a rotational movement of rock shaft 51 and rock arms 52 upon energization and de-energization of solenoid 77. Spring 83 also serves to urge armature 81 downwardly from solenoid 77 when the latter becomes de-energized.

To ascertain the presence of a workpiece on conveyor belts 23 between the input and delivery ends of the apparatus, there is an electromagnetic radiation detecting means comprising a photocell 84, and a light source 85 both of which are designed to cooperate in detecting the arrival of the leading edge of a workpiece as it passes over the clamp rod 50. Light source 85 is supported above conveyor belts 23 on a bracket 86 which is slidable horizontally at one end along the upper right-hand sprocket wheel shaft 68, as seen in FIG. 4, and at the other end along a support bar 87 mounted fixedly between front and rear walls 18, 19. Adjustable collars 88 may be mounted on support bar 87 at opposite sides of bracket 86 to keep the bracket from sliding to any appreciable extent along the bars above conveyor belts 23.

Photocell 84 is arranged beneath conveyor belts 23 and is mounted in a socket 89 that is equipped at its bottom side (FIG. 4) with magnets (not shown) that are atracted to a steel plate 90 mounted on base plate 17. In this way the position of photocell 84 may be varied, so as to receive light from the light source 85 above the conveyor belts 23 through a passage between adjacent conveyor belts. Preferably the photocell 84 and light source 85 are mounted vertically in a plane between two of the conveyor belts 23 so that the light zone between them will not be cut-off by belts 23. A hole (not shown) in the conveyor belt platform 21 is also provided to avoid any interference with the light zone.

*Inverting phase*

Figure 10:
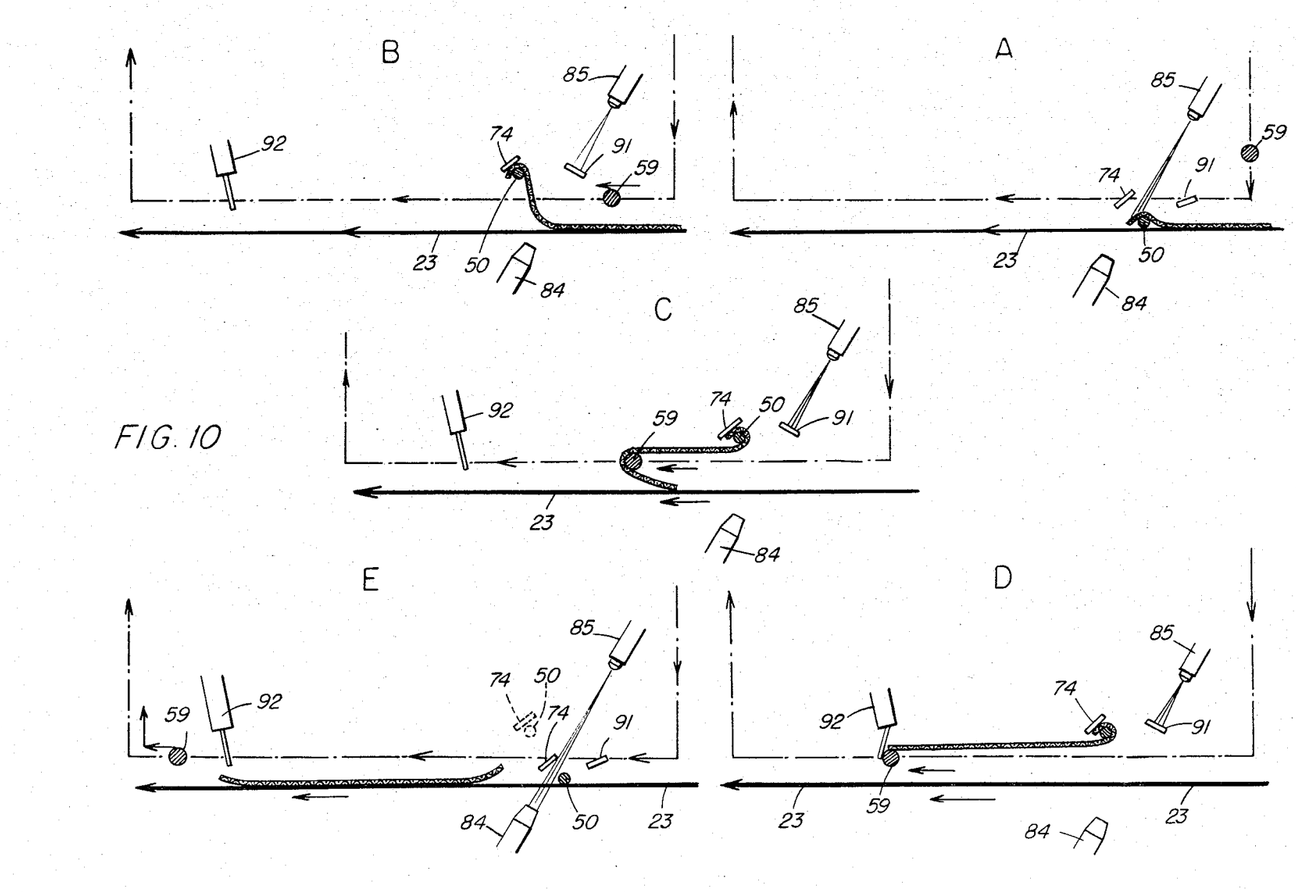
FIG. 10 is a diagrammatic illustration comprising 5 sketches showing the inverting phase of operation in different stages.

Referring now more particularly to FIG. 10 the inverting phase of operation of the apparatus can be understood more clearly. The various stages of this phase are sketched as stages A, B, C, D and E in the figure. In the first stage namely stage A, a work piece is carried on the moving conveyor belts 23 toward the delivery end of the apparatus. As the leading edge of the work piece passes over the rotating clamp rod 50 it interrupts the light beam thereby darkening photocell 84. Through appropriate circuitry, to be described hereinafter, this actuates solenoid 77, and after a short delay period controlled by the circuitry, during which time solenoid 77 completes its movement, inverter rods 59 begin to move as indicated in stage B.

Energization of solenoid 77 causes clamp rod 50 to be lifted off conveyor belts 23 and against clamp plate 74 so as to clamp the leading edge of the work piece firmly between the clamp rod and clamp plate. The clamp plate is also lifted somewhat at this time. Armature 81 is pulled upwardly into solenoid 77 thereby rotating rock shaft 51 by means of crank arm 79, and rotation of rock shaft 51 raises rock arms 52 thereby lifting clamp rod 50 away from belts 23. Lifting the clamp rod above belts 23 causes the rod to stop rotating, because driving disc 53 is separated from friction wheel 58 as the clamp rod is lifted. (See FIG. 6.) In its upward movement, clamp rod 50 follows an arcuate path which crosses through the light beam and would darken the photocell 84 were it not for the fact that it is already darkened by the presence of the work piece. To keep photocell 84 darkened until clamp rod 50 has again passed through the light zone after the work piece has passed completely through the zone and the rod is returned to belts 23, a light shield 91 is provided (see also the position of parts in FIG. 1). Light shield 91 comprises a narrow elongated plate parallel with clamp rod 50 and mounted at its ends on rock arms 52 above, but adjacent the clamp rod.

In stage C of FIG. 10 the inverter rod 59 contacts the upper surface of the work piece below clamp rod 50, but above conveyor belts 23 and pushes it toward the delivery end of the apparatus. During this movement inverter rod 59 preferably travels about twice as fast as conveyor belts 23 so that the tail end of the work piece is pulled forward, under and ahead of the clamp rod 50. Even after the tail end of the work piece has passed through the light zone photocell 84 is kept darkened by light shield 91. Light shield 91 is moved into the position in which it has this effect by the lifting of clamp rod 50.

In stage D the inverter rod 59 continues inverting the work piece, and as it finishes this job it contacts a normally closed micro switch 92 which opens the circuit to and thereby de-energizes solenoid 77 allowing clamp rod 50 to release the work piece and to return to conveyor belts 23, as shown in stage E of FIG. 10.

In stage E, the final stage of the inverting phase, the work piece is back on conveyor belts 23, clamp rod 50 has returned to the conveyor belts 23 as well, and light shield 91 has moved out of the light zone so photocell 84 again receives light from source 85. The inverter rod 59 has passed micro switch 92 and continues traveling until micro switch 72 (shown in FIGS. 4 and 8) is tripped. Micro switch 92 becomes closed again as soon as inverter rod 59 has passed beyond it.

Referring to FIG. 4, micro switch 92 is mounted on rear wall 19 via a pair of rails 93 secured at their ends in a pair of brackets 94 attached to the rear wall. The position of micro switch 92 on these rails is adjustable by means of screws 95 so that the switch actuating arm 206 can be positioned at different distances from the clamp rod 50 according to the length of work pieces being inverted.

Figure 8:
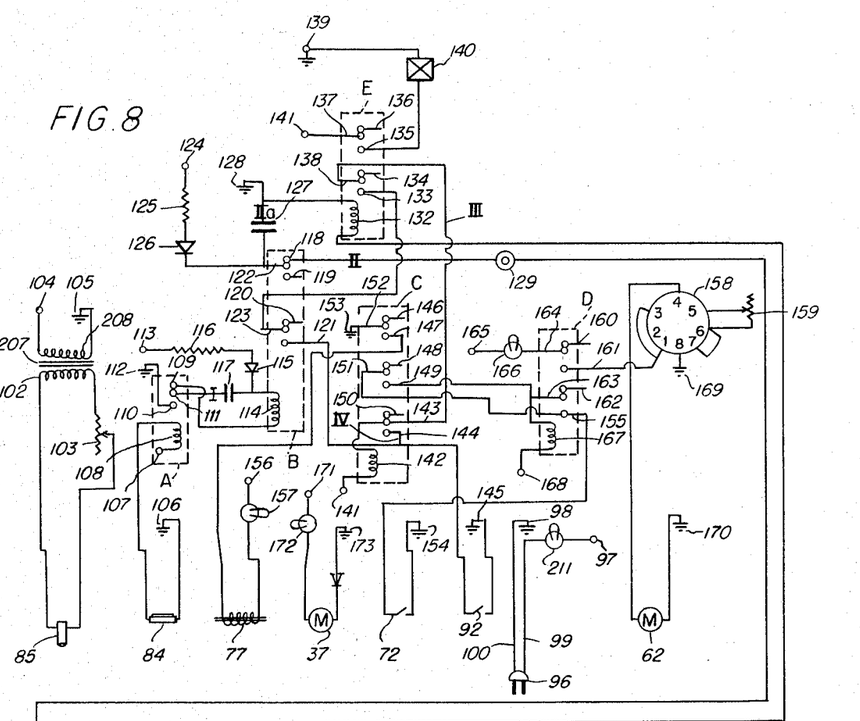
FIG. 8 is an electrical diagram showing the major portion of the circuits provided for controlling the operation of the machine.

Power is supplied to the apparatus from a 110 volt 60 cycle power source (not shown) to suitable connecting means 96 as shown in FIG. 8. Connecting means 96 is series connected to a main hot terminal 97 and a main ground terminal 98 via lines 99 and 100, respectively. In series with line 99 is a hand operable switch 211 to permit the operator to stop the entire apparatus at once. All hot terminals hereinafter referred to are connected in parallel with main hot terminal 97, and all ground terminals hereinafter referred to are connected in parallel with main ground terminal 98. Since normal operation of the apparatus begins with a work piece interrupting the light between light source 85 and photocell 84, the description of the control circuitry for the apparatus will begin with these two elements.

Light source 85 is preferably a 6 volt light source. It is connected with a 6 volt electrical supply by being connected in a series circuit which also includes the secondary coil 102 of a transformer 207, and a variable rheostat 103. Transformer 207 has a primary coil 208 which is connected across a hot terminal 104 and a ground terminal 105.

Before a work piece enters the light zone, light impinges upon photocell 84. This photocell is connected in a series circuit which also includes a ground terminal 106, a hot terminal 107, and a relay coil 108 which is series connected between photocell 84 and hot terminal 107. Ground terminal 106 is connected to the other side of photocell 84. Coil 108 is part of a spring return relay A which controls adjacent circuitry each time a work piece passes between photocell 84 and light source 85. Relay A has two contacts 109 and 110 and a switch arm 111. Contact 110 is series connected to a ground terminal 112 and contact 109 is series connected to a hot terminal 113. Between contact 109 and hot terminal 113 is a series circuit beginning at contact 109 and including in order a coil 114, a rectifier 115 and a resistor 116. Series connected between switch arm 111 and the junction between coil 114 and rectifier 115 is a capacitor 117.

As long as light impinges upon photocell 84, sufficient current will flow between hot terminal 107 and ground terminal 106 to energize the coil 108 and actuate the relay to its energized position. When relay A is energized switch arm 111 is connected with contact 110 thereby setting up a capacitor charging circuit I in which energy flows from hot terminal 113 through resistor 116, rectifier 115 into capacitor 117 one side of which is connected to ground terminal 112 via contact 110, and switch arm 111.

When a work piece comes between light source 85 and photocell 84 the photocell is darkened and its electrical resistance is increased thereby decreasing the current flow from hot terminal 107 to ground terminal 106 to the point where coil 108 becomes de-energized. Upon de-energization of coil 108, switch arm 111 is spring returned from contact 110 to contact 109. This effectively connects coil 114 across charged capacitor 117 thereby discharging the capacitor through the coil which is briefly energized by the resulting current flowing through it. Energization of coil 114 continues for as long as it takes to discharge capacitor 117 to a predetermined level. The length of this discharge period is determined by the values of each element. For example, the value of capacitor 117 may be about 60 microfarads if coil 114 has the resistance and inductance of a standard coil in a spring return relay.

Coil 114 is part of a spring return relay B having four contacts, namely, 118, 119, 120 and 121, and two switch arms 122 and 123. Switch arm 122 operates between blind contact 119 and contact 118 which forms part of an impulse relay circuit II for controlling the sequence of the inverting and non-inverting phases of apparatus operation. Circuit II includes a hot terminal 124 connected to switch arm 122 by a series circuit including in order beginning at hot terminal 124, a resistor 125 and a rectifier 126. Also connected to a switch arm 122 is a capacitor 127 which is series connected to a ground terminal 128. Contact 118 itself is series connected to a reset button 129, the purpose of which will be hereinafter explained, and reset button 129 is connected with ground terminal 128 by a series circuit which includes in order a switch arm 130, contact 131 and relay coil 132. Switch arm 130 and contact 131 are part of a relay H which will be hereinafter described in connection with the circuitry for automatically opening and closing circuit II so as to change the sequence of the inverting and non-inverting phases whenever a work piece of double thickness is detected at the input.

Relay coil 132 is part of an impulse relay E which is designed to make the electrical connections which determine which phase of operation the apparatus will carry out the next time photocell 84 is darkened. Relay E is not a spring return relay but operates in a different direction each time it is energized. It includes four contacts, 133, 134, 135 and 136, and two switch arms 137 and 138. Contact 136 is blind, and contact 135 is series connected to a ground terminal 139 through a sequence light 140. Switch arm 137 is series connected to a hot terminal 141. Contact 134 is also a blind contact, but switch arm 138 and contact 133 are both part of the key circuit III for controlling the inverter mechanism during the inverting phase of the apparatus. Circuit III includes a relay C, which begins the inverting phase when it becomes energized.

Actuation of relay B by energization of coil 114 for a brief period during the discharge of capacitor 117 causes switch arm 122 to move away from contact 118 and to connect with blind contact 119. This opens circuit II thereby completing a circuit IIa for charging capacitor 127. Circuit IIa extends from hot terminal 124 to ground terminal 128 through a resistor 125, rectifier 126 and capacitor 127 in that order. Capacitor 127 becomes fully charged while the circuit IIa remains completed.

When capacitor 117 has discharged to a predetermined level, coil 114 becomes de-energized and switch arms 122, 123 will be spring returned to their former positions opening circuit IIa and recompleting circuit II. The current which begins to flow in circuit II from hot terminal 124 through coil 132 is not sufficient in and of itself to energize the coil and actuate relay E. However circuit II now includes charged capacitor 127 which is connected across coil 132 and provides an additional current flowing through the coil. The total current through the coil is large enough to energize coil 132 and actuate relay E thereby disconnecting switch arm 138 from blind contact 134 and connecting it with contact 133. It also causes sequence light 140 to become illuminated by disconnecting switch arm 137 from blind contact 136 and connecting it with contact 135. The light tells anyone observing the apparatus that the next phase of operation will be an inverting phase.

Connecting switch arm 138 with contact 133 prepares key actuating circuit III mentioned hereinbefore, for completion the next time relay B is actuated by the energization of coil 114. Current III extends from a hot terminal 141 to a ground terminal 145 via a series circuit which includes in order beginning at hot terminal 141, a relay coil 142, a switch arm 143, switch arm 138, contact 133, switch arm 123, contact 121 and a normally closed micro switch 92. The effect of the completion of circuit III is to energize relay coil 142 and actuate relay C which has been mentioned hereinbefore.

Relay C is a spring return relay and includes six contacts namely, contacts 146, 147, 148, 149, 150 and 144. It also includes three switch arms, namely, 151, 152 and 143. Switch arm 152 is connected to a ground terminal 153, and switch arm 151 is series connected to a ground terminal 154 through a relay contact 155 to be discussed hereinafter in connection with relay D and which is in series with micro switch 72. It should be recalled that micro switch 72 is normally closed.

Energization of coil 142 and the resulting actuation of relay C does three things. First, it completes a circuit which energizes and actuates solenoid 77 by disconnecting switch arm 152 from blind contact 146 and connecting it with contact 147. This circuit begins at hot terminal 156 and runs to ground terminal 153 via a series circuit which includes a hand operated switch 157, solenoid 77, contact 147, and switch arm 152. The reader will recall that the function of the energization of solenoid 77 is to raise the clamp rod off of the conveyor belt and against the clamp plate holding the leading edge of the work piece firmly between the two.

The second thing achieved by the actuation of relay C is the completion of a holding circuit IV which maintains the relay actuated until the circuit is opened by the opening of micro switch 92 when its arm 206 is contacted by an inverter rod 59 as the rod completes inverting a work piece. The holding circuit is completed when switch arm 143 is disconnected from blind contact 150 and connected with contact 144. It begins at hot terminal 141 and comprises a series circuit including relay coil 142, switch arm 143, contact 144, micro switch 92 and ground terminal 145. Thus contact 144 is connected with circuit III at a point intermediate contact 121 and micro switch 92. It should be clear therefore that key actuating circuit III is connected in parallel with switch arm 143 and contact 144, so that when relay B becomes de-energized relay C remains unaffected.

The third function of relay C is to start the inverter rod motor 62 after a delay period in which clamp rod 50 is returned to conveyor belts 23, and in which the former leading edge of the work piece is released from between clamp rod 50 and clamp plate 74. To provide this delay period there is a timer 158 which is energized by the actuation of relay D which itself is energized and actuated by one of the circuits completed by the actuation of relay C. Timer 158 is of a known type and has a control 159 for selective adjustment of certain time periods which are built into it.

Relay D has four contacts namely blind contacts 160, 162 and contacts 161, 155. It also has two switch arms 163 and 164. Switch arm 164 is connected in series with a hot terminal 165 through a hand operated switch 166 which is normally closed. Relay C is connected to relay D by means of connections from contact 149 and switch arm 151. Switch arm 151 is series connected to contact 155 in relay D while contact 149 is series connected to switch arm 163 and to relay coil 167. The latter coil is in turn series connected to a hot terminal 168.

Relay D as with relays A, B and C is of the spring return type. Thus when coil 167 is de-energized switch arm 164 will be spring returned to contact with blind contact 160 and switch arm 163 will be returned to contact with blind contact 162. Actuation of relay C completes a series circuit from hot terminal 168 to ground terminal 154 to energize coil 167 and relay D. This circuit begins at hot terminal 168 and includes coil 167, contact 149, switch arm 151, contact 155, micro switch 72 and ground terminal 154. Energization of relay coil 167 actuates relay D thereby disconnecting switch arm 164 from blind contact 160 and disconnecting switch arm 163 from blind contact 162. Switch arm 164 is connected with contact 161 and switch arm 163 is connected with contact 155. This latter connection completes a series holding circuit for maintaining relay coil 167 energized until micro switch 72 is opened by an inverter rod 59. Thus de-energization and spring returned actuation of relay C before the opening of swich 72 will not affect relay D. The holding circuit begins at hot terminal 168 and includes relay coil 167, switch arm 163, contact 155, micro switch 72 and ground terminal 154.

The connection of switch arm 164 with contact 161 completes an electrical circuit to timer 158 ending in a ground terminal 169 to which timer 158 is connected. Also connected to the timer is a series circuit including the inverter rod motor 62 ending with a ground terminal 170. Energization of timer 158 begins the delay period during which time current flows from hot terminal 165 to ground terminal 169 through switch 166, switch arm 164, contact 161 and timer 158. When the delay period has ended, timer 158 operates to energize inverter rod motor 62 by a current flowing from hot terminal 165 through switch 166, switch arm 164, contact 161, timer 158, motor 62 and ground terminal 170.

In addition, there is a circuit V provided for actuating the conveyor motor 37 independently of the above described automatic actuating circuits. Circuit V includes a hot terminal 171 series connected to a hand operable switch 172 which in turn is in series with conveyor motor 37 which is connected with a ground terminal 173. This circuit enables the conveyor mechanism and friction wheel 58 to be driven without interruption as long as power is supplied to motor 37. Hand operable switch 172 is in a normally closed position but may be opened to stop conveyor motor 37 without affecting the operation of the remainder of the automatic circuitry in the apparatus.

As mentioned hereinbefore, the apparatus is also provided with means for automatically temporarily changing the sequence of the inverting and non-inverting phases of the operational cycle when a double layer of work pieces appears at the input. This temporary change in the sequence of the two phases is accomplished as mentioned hereinbefore by means which are sensitive to the thickness of work pieces appearing at the input. When a work piece ply is translucent, in that it does not absorb or reflect all of the light to which it is exposed, but allows some of it to pass through, the means may include a light source 174, a photocell 175 and their associated circuitry. The light source 174 is mounted in a bracket 176 (see FIGS. 1, 2 and 4) which is adjustably mounted on a rod extending above and across the upper runs of conveyor belts 23 ahead of light source 85. Rod 177 is fastened at both ends to bracket means 178 which are suitably secured to idle roller support brackets 34 which have been mentioned hereinbefore. Photocell 175 is mounted on a rod 179 disposed below the upper runs of conveyor belts 23, and mounted at opposite ends in brackets 34. Bracket means 180 hold the photocell in a fixed position so that the light beam from light source 174 can strike it, but photocell bracket 180 is adjustably mounted on rod 179 so that it can be moved along the rod. Other means for detecting the work piece thickness may be used when the work pieces are made of opaque material through which ordinary visible light cannot penetrate. Assuming that the work pieces are translucent, photocell 175 is preferably of the variable resistance type and is adjustable so as to remain sensitive to that percentage of light which will pass through the thickness of one work piece, and yet be insensitive to the percentage of light passing through two superimposed work pieces passing through the light zone between light source 174 and photocell 175. Light source 174 is preferably connected to a transformer 181 via a rheostat 182 in a manner similar to that described in connection with light source 85. Thus, light source 174 is preferably a 6 volt source and transformer 181 is connected across a hot terminal 183 and a ground terminal 184.

Figure 9:
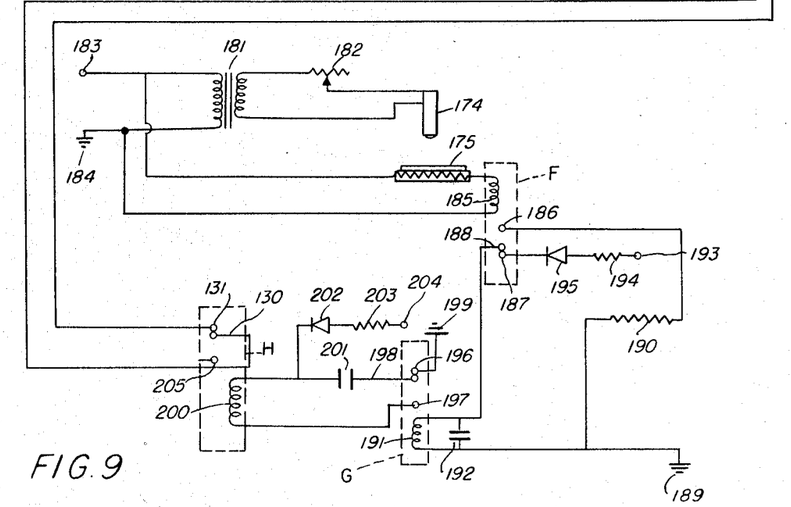
FIG. 9 illustrates an additional circuit which is connected into the circuit of FIG. 8 and shows the automatic phase correction switch means.

Also connected across hot terminal 183 and ground terminal 184 is a series circuit containing photocell 175 in series with a relay coil 185. Coil 185 is part of a relay F which is de-energized and actuated whenever two work piece plies, one on top of the other, are detected at the input to the apparatus. Relay F is of the spring return type and has two contacts 186, 187 and a switch arm 188.

When no work piece is in the light zone between light source 174 and photocell 175, or when a single thickness work piece is in the zone, sufficient current passes from hot terminal 183 through photocell 175 and relay coil 185 to ground terminal 184 to energize the coil 185 so that switch arm 188 is connected with contact 186. Contact 186 is series connected to a ground terminal 189 via a resistor 190, and switch arm 188 is also connected to the same ground terminal 189, but through a parallel circuit including a relay coil 191 and a capacitor 192. Contact 187 is series connected with a hot terminal 193 by means of a resistor 194 and a rectifier 195 in series with each other. The polarity of the rectifier is such that whenever switch arm 188 is connected with contact 187 current will flow from hot terminal 193 to ground terminal 189.

Relay coil 191 is part of a relay G which initiates the temporary change in sequence between the inverting and non-inverting phases of operation of the apparatus whenever two work piece plies are detected by photocell 175. Relay G has two contacts 196 and 197 and one switch arm 198. Contact 196 is series connected with a ground terminal 199, and contact 197 is series connected with switch arm 198 by means of a relay coil 200 which is in series with a capacitor 201. One end of a rectifier 202 is connected between capacitor 201 and relay coil 200. The other end of rectifier 202 is series connected with one end of a resistor 203, the other end of which is connected to a hot terminal 204.

Relay coil 200 is part of a relay H which includes contact 131, mentioned hereinbefore, and a blind contact 205. It also includes previously mentioned switch arm 130. Relay H is a spring return relay and when coil 200 is de-energized switch arm 130 is connected with contact 131.

For the purpose of explaining the operation of the apparatus in connection with its circuitry, it will be assumed that an inverting phase has just been completed and that a work piece is just beginning to enter the light zone between light source 85 and photocell 84. In other words, light is impinging upon photocell 84 which has not yet darkened. Before proceeding further with the analysis it would be well to note that in this condition relays B, C, D, E, G and H are de-energized. Thus in relay B switch arm 123 is connected to contact 120 and switch arm 122 is connected to contact 118. In relay C switch arm 152 is connected to blind contact 146, switch arm 151 is connected to blind contact 148, and switch arm 143 is connected to blind contact 150. In relay D switch arm 164 is connected to blind contact 160, and switch arm 163 is connected to blind contact 162. In relay E switch arm 137 is connected to blind contact 136, and sequence light 140 is darkened. Switch arm 138 is connected to blind contact 134. In relay G switch arm 198 is connected to contact 196, and in relay H switch arm 130 is connected to contact 131. In this condition capacitor 201 has been charged. In addition, current is flowing through relay coil 132 in relay E, but the amount of current flowing is not sufficient to energize the coil 132. The other circuits connected to these relays are dormant.

Relays A and F are energized, however, because we assume the work piece entering the light zone is a work piece of only a single thickness. Thus, sufficient light impinges upon photocell 84 to energize relay coil 108 in relay A, and sufficient light impinges upon photocell 175 to energize relay coil 185 in relay F. Switch arm 188 is therefore connected with contact 186 and switch arm 111 is connected with contact 110. In this condition capacitor 117 has become charged.

At this point for the purposes of the description let us assume that the work piece passes through the light zone and photocell 84 becomes darkened thereby increasing its resistance, and de-energizing relay coil 108 due to the decreased current flow. Relay A actuates and disconnects switch arm 111 from contact 110 and connects it with contact 109 as the coil 108 is de-energized. This shorts capacitor 117 across relay coil 114 and relay B thereby energizing the coil 114 briefly. This actuates relay B disconnecting switch arm 123 from contact 120 and connecting it with contact 121, and disconnecting switch arm 122 from contact 118 and connecting it with contact 119. The work piece continues to pass over clamp rod 50 on conveyor belts 23 without further disturbance. In the circuits, however, capacitor 127 is now being charged by current flowing through circuit IIa. Capacitor 127 charges fully during the period in which relay coil 114 is energized by capacitor 117. The key actuating circuit III is not completed during this period because switch arm 138 lies in contact with blind contact 134, disconnected from contact 133.

After a brief period, the charge remaining on capacitor 117 has decreased to the point where coil 114 becomes de-energized. Relay B is now spring returned to its former position, and switch arm 123 is reconnected to contact 120 while switch arm 122 is reconnected to contact 118. This latter connection completes circuit II which includes relay coil 132 in relay E. Current begins to flow through this coil furnished partly by hot terminal 124 and partly by capacitor 127 which has just been charged. The total current is sufficient to energize coil 132 and actuate relay E thereby disconnecting switch arm 138 from blind contact 134 and connecting it with contact 133 and disconnecting switch arm 137 from blind contact 136 connecting it with contact 135.

The effect of this movement is to set the key actuating circuit III in condition for completion the next time relay coil 114 is energized. It also lights sequence light 140 giving a visual indication to an observer of the machine that the next phase of operation to be begun will be an inverting phase. When the charge on capacitor 127 has reached a predetermined low level, relay coil 132 becomes de-energized, but inasmuch as relay E is not a spring return relay, de-energization of that coil causes no change in its condition.

By this time the work piece has passed completely over the clamp rod and light once again impinges upon photocell 84. Thus relay A is again actuated and switch arm 111 is placed in contact with contact 110 completing the circuit I for charging capacitor 117. As the leading edge of the next work piece passes over the clamp rod, photocell 84 becomes darkened and relay A is spring returned to its former position completing the circuit which shorts capacitor 117 across relay coil 114. This actuates relay B.

As before, actuation of relay B opens circuit II and completes a charging circuit IIa to capacitor 127. In addition, however, this time the key actuating circuit III is completed by the connection of switch arm 123 with contact 121, thereby energizing relay coil 142, and actuating relay C.

Energization of relay C connects switch arm 152 with contact 147 thereby energizing solenoid 77. It also moves switch arm 151 from blind contact 148 to contact 149 and switch arm 143 from blind contact 150 to contact 144, thereby setting up a holding circuit IV as discussed hereinbefore, so that relay C will remain actuated even after relay coil 114 becomes de-energized. Energization of solenoid 77 raises clamp rod 50 off conveyor belts 23 and against the clamp plate 74 with the leading edge of a work piece held tightly between the two. This circuit will remain completed until actuation of micro switch 92 at which time relay coil 142 becomes de-energized and relay C is spring returned to its former position.

Connection of switch arm 151 with contact 149 completes the circuit through relay coil 167 for energizing and actuating relay D. Actuation of relay D completes the holding circuit to maintain relay coil 167 energized until micro switch 72 is tripped open by an inverter rod as it completes its path of travel. Actuation of relay D also completes a circuit with delay timer 158 which completes a circuit to motor 62 after a slight delay period thereby starting inverter rod motor 62.

The lower of the two inverter rods thereby begins its path of travel to the delivery end of the apparatus contacting the upper surface of the work piece and inverting it as it goes. During this time, capacitor 117 will have reached a predetermined level of discharge and relay coil 114 will become de-energized thereby enabling relay B to be spring returned again to its original position. This would open the key actuating circuit III were it not for the holding circuit V previously described which maintains relay coil 142 in a fully energized state. Spring actuation of relay B connects switch arm 122 with contact 118 thereby briefly energizing relay coil 132 again until capacitor 127 has reached its predetermined discharge level. This actuates relay E to shut off the sequence light 140 indicating to the observer that the next phase of apparatus operation will be a non-inverting phase. It also disconnects switch arm 138 from contact 133.

Nothing further happens to the circuitry until inverter rod 59 opens micro switch 92 thereby de-energizing coil 142 allowing relay C to be spring returned to its former position. This movement opens the circuit through solenoid 77 permitting clamp rod 52 to descend from clamp plate 74 so as to release the work piece. The dashpot 78 serves to make this descent a smooth one. The movement also breaks the circuit from relay C to relay D, but relay coil 167 remains energized because of the holding circuit hereinbefore described. Thus, the inverter rods continue to move. Eventually one of them opens normally closed micro switch 72 thereby de-energizing coil 167 permitting relay D to be spring returned to its former position. This opens the circuit to inverter rod motor 62 and stops the motor. The inverting phase operation of the apparatus is now over, and the cycle of operation is about to begin again.

For the purpose of understanding the circuitry for temporarily changing the phase sequence of the apparatus, it is instructive to analyse what happens if the next work piece to be detected at the input is of double thickness. For the purpose of the analysis it will be assumed that a double thickness translucent work piece, i.e., two work pieces one on top of another are entering the apparatus at the input, but that they have not yet entered the light zone between source 174 and photocell 175. Thus light impinges upon photocell 175 reducing its resistance to the point at which sufficient current flows from hot terminal 183 to ground terminal 184 to energize coil 185 and relay F. In an energized state switch arm 188 in relay F is disconnected from contact 187 and connected with contact 186.

Energization of relay F completes a circuit which includes relay coil 191, but which has no energy source except capacitor 192, and most of the energy from this capacitor will flow to ground terminal 189 either directly or through resistor 190. Relay G is necessarily de-energized under these conditions because any current flowing from capacitor 192 through relay coil 191 will not be sufficient to energize the relay. Switch arm 198 is therefore connected with contact 196 completing a charging circuit to capacitor 201. Relay coil 200 has no current flowing through it because contact 197 is isolated.

Thus relay H is also de-energized, under these conditions, thereby assuring that switch arm 130 will remain in connection with contact 131 to keep that portion of circuit II closed until relay H is energized.

Continuing with the analysis let us assume that a double thickness work piece has entered the light zone between source 174 and photocell 175. Relay F will become de-energized due to the darkening of photocell 175, and switch arm 188 will be spring returned to connection with contact 187. This completes a circuit for charging capacitor 192. Since the current through relay coil 191 cannot change instantaneously and since no current is flowing through it when switch arm 188 is connected with contact 187, all the current will initially flow through capacitor 192 until it has reached a predetermined level of charge. Only then will current sufficient to energize coil 191 flow through the coil.

Thus the function of capacitor 192 is to provide a delay period before relay G can be energized and actuated. The function of this delay period is to insure that darkening of photocell 175 is not due simply to one edge of a single ply fabric being folded over a portion of the body, but rather to a double thickness work piece on the conveyor belts. If only a folded edge passes through the light zone relay F will be quickly re-energized and switch arm 188 will be reconnected with contact 186 thereby providing a path through resistor 190 by means of which capacitor 192 will be fully discharged before photocell 175 is darkened again.

Assuming now that a double thickness work piece has darkened photocell 175 and that the delay period caused by capacitor 192 has elapsed, relay G is energized and actuated. This moves switch arm 198 from contact 196 to contact 197 thereby connecting relay coil 200 across capacitor 201 thereby briefly energizing coil 200 and actuating relay H causing switch arm 130 to be disconnected from contact 131 and connected with contact 205. This opens circuit II in exactly the same manner as it is opened by energization of relay B.

Thus opening of circuit II in this manner completes charging circuit IIa to capacitor 127 as described previously in connection with FIG. 8 so that when relay H is de-energized and switch arm 130 reconnects with contact 131, relay E will become energized and will shift the circuitry connections to repeat the phase of operation just completed or just now being completed.

The physical separation between the light zone between source 174 and photocell 175 and that between source 85 and photocell 84 is such that when a double thickness work piece is detected by photocell 175 relay H will become energized and be de-energized again before the leading edge of the work piece is detected at photocell 84. This insures that the automatic sequence changing circuits will have completed their operation before the double thickness work piece is detected by photocell 84 without otherwise disturbing the operation of the apparatus.

Hard operable switch 129 is inserted in circuit II to enable an operator to provide manual means for changing the sequence of phases of the operational cycle irrespective of whether or not the circuitry for automatically changing such sequence functions properly. Thus, if a double thickness work piece is not detected by photocell 175, an operator can nonetheless actuate switch 129 to repeat a phase of operation so that after the double thickness passes through the apparatus the work pieces will still arrive at the delivery end with their desired surfaces facing upwardly.

While a preferred form of the invention has been described in considerable detail in order to explain the nature of the invention, it will be understood that various changes in the details, common material and arrangement of parts may be made by those skilled in the art within the principle and scope of the invention and expressed in the appended claims. For example, instead of using light source and photocell to detect the presence of single and double thickness work pieces any source of electromagnetic radiation and means for detecting same whether in the visible light region or not may be used provided the density of the work piece passing between the two is sufficient to enable the detection means to change condition whenever such work piece comes between it and the electromagnetic radiation source.

What is claimed is:

1. Apparatus for automatically inverting alternate work pieces formed of flexible flat material, said apparatus having an input and a delivery end and comprising means for continuously conveying work pieces from the input end to said delivery end, first electrical circuit means for detecting the presence of each work piece in a predetermined zone, adjacent said conveying means and intermediate the ends of said apparatus, said first circuit means being also adapted to select every other workpiece detected, a mechanism controlled by said first circuit means for automatically inverting all selected work pieces, thereby dividing the operation of said apparatus into two phases, namely an inverting phase and a non-inverting phase, and additional electrical circuit means for detecting the presence of two superimposed work piece plies in a second predetermined zone, adjacent said conveying means and intermediate said apparatus input end and said first predetermined zone, said additional circuit means cooperating with said first electrical means for automatically repeating either of the inverting and non-inverting phases of operation according to whichever operational phase is about to begin whenever two superimposed work piece plies are detected in said second predetermined zone.

2. Apparatus according to claim 1 wherein said additional electrical circuit means includes a source for radiating electromagnetic waves through said second predetermined zone and electromagnetic radiation detection means sensitive to changes in radiation going through said second zone according to the passage of two superimposed work piece plies passing into and out from said second zone, but insensitive to the passage of a single work piece ply passing therethrough.

3. Apparatus according to claim 2 wherein said source comprises a light source, and where said detection means comprises light sensitive means cooperating with said light source.

4. Apparatus according to claim 1 wherein said conveying means comprises, an endless belt conveyor and at least one end moving belt, a rotatable clamp rod resting on said belts, but extending transversely thereof and positioned adjacent said first predetermined zone, means for rotating said rod conversely to the rotational direction in which it is urged by its frictional contact with said belt, and wherein said first and additional circuit means include a plurality of electromagnetic relays, switches and at least one solenoid cooperatively connected with said clamp rod to make said apparatus self-programing in that each operationg cycle occurs automatically in a sequence determined by said relays and switches.

5. Apparatus for automatically inverting selected flexible flat material work pieces, said apparatus having an input and a delivery end and comprising means for continuously conveying work pieces, from the input end to said delivery end, first electrical circuit means for detecting the presence of each work piece in a predetermined zone adjacent said conveying means and intermediate the ends of said apparatus, said first circuit means being also adapted to select certain of the detected work pieces, and a mechanism controlled by said first circuit means for automatically inverting work pieces selected by said circuit means; wherein said first electrical circuit means is adapted to select every other work piece detected; whereby alternate work pieces are inverted by said controlled mechanism and are conveyed to the delivery end of said apparatus in an upside down condition with respect to their former orientation, the operation of said apparatus thus being carried out in two phases, namely an inverting phase and a non-inverting phase; and wherein said conveying means comprises an endless belt conveyor having at least one endless moving belt, a rotatable clamp rod frictionally contacting said belt transversely to its direction of movement adjacent said predetermined zone, and means for rotating said rod conversely to the rotational direction in which it is urged by its frictional contact with said belt.

6. Apparatus according to claim 5 wherein there are a plurality of endless moving belts separated a distance from each other, but moving in the same direction and at the same speed, said clamp rod frictionally contacting each of said belts transversely to their direction of movement adjacent said predetermined zone.

7. Apparatus according to claim 5 wherein said inverting mechanism comprises clamping means for lifting and holding a leading edge portion of a selected work piece above said endless belt, an inverter rod, and means controlled by said clamping means for driving said inverter rod toward the delivery end of said apparatus between said clamping means and said endless belt at a speed greater than said belt whenever a leading edge portion of a selected work piece is held by said clamping means; whereby said inverter rod will contact the top surface of said work piece between said clamping means and said belt and will invert it by flipping it under and ahead of said clamping means.

8. Apparatus according to claim 7 wherein said clamping means includes a clamp rod contacting said endless belt, and extending transversely thereof a clamping plate lying parallel with but above said rod, and means for raising said clamp rod off said belt, and for urging it against said plate whenever a leading edge portion of a selected work piece has passed over said rod and into said predetermined zone, means for disconnecting said rod from its rotating means when said rod is so raised; whereby said leading edge portion is firmly clamped between said rod and said plate at a point above said belt.

9. Apparatus for automatically inverting selected flexible flat material work pieces, said apparatus having an input and a delivery end and comprising means for continuously conveying work pieces from the input end to said delivery end; first electrical circuit means for detecting the presence of each work piece in a predetermined zone adjacent said conveying means and intermediate the ends of said apparatus; said first electrical circuit means being also adapted to select certain of the detected work pieces, said means including a source for radiating electromagnetic waves through said predetermined zone and electromagnetic radiation detection means cooperating with said source and which is sensitive to change in radiation going through the zone according to the passage of a work piece into and out from said predetermined zone; and a mechanism controlled by said first electrical circuit means for automatically inverting work pieces selected by said circuit means.

10. Apparatus according to claim 9 wherein said source comprises a light source and said detection means comprises light sensitive means cooperating with said light source.

References Cited by the Examiner
UNITED STATES PATENTS 1,040,480  10/1912  Wood _______________ 271—65
2,837,198  6/1958  Griffin _______________ 198—34

EVON C. BLUNK, *Primary Examiner.*

RICHARD E. AEGERTER, *Examiner.*